May 30, 1944.  H. A. STRICKLAND, JR  2,349,835
WELDING TOOL
Filed Sept. 25, 1941  4 Sheets-Sheet 1
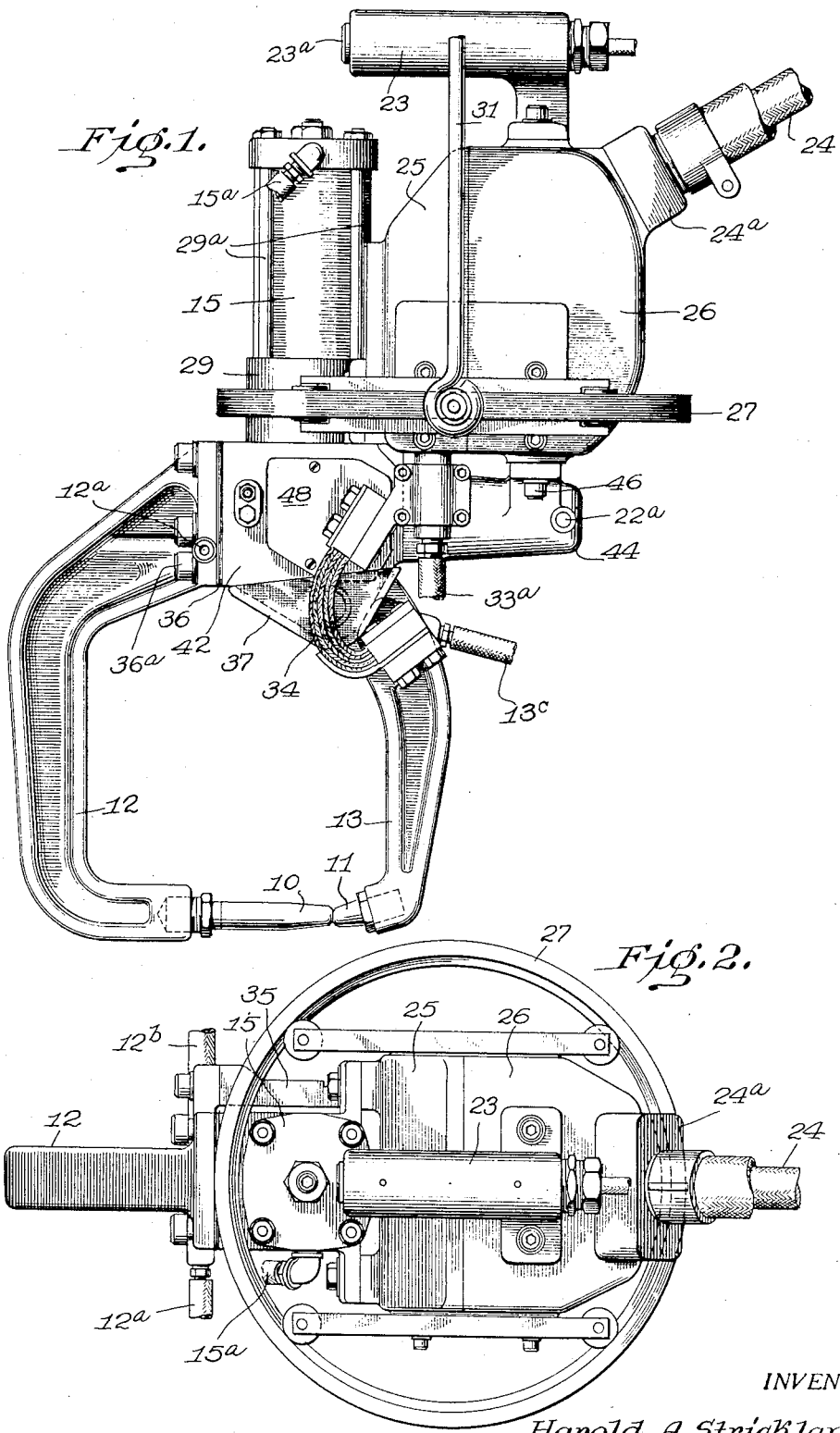
INVENTOR
Harold A. Strickland, Jr.
BY
ATTORNEY

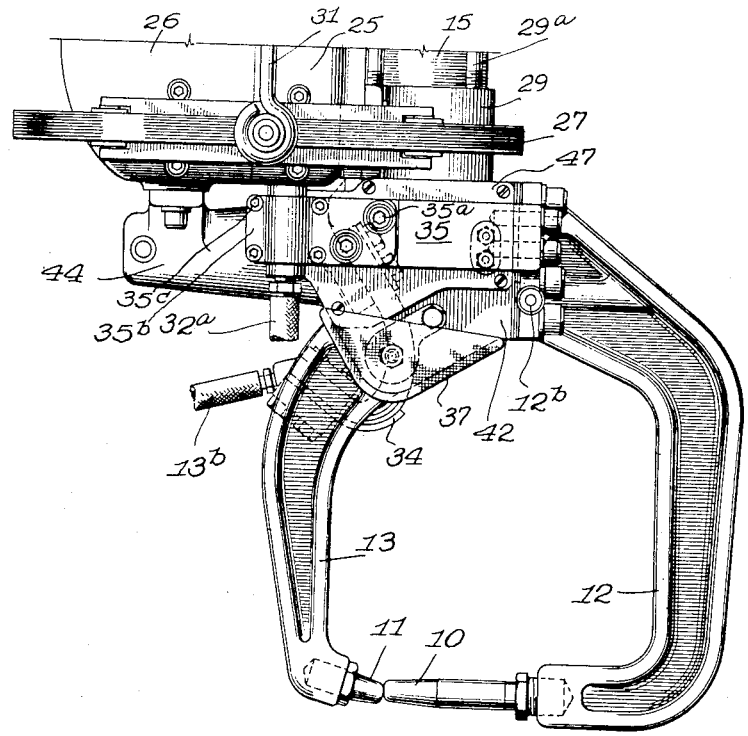
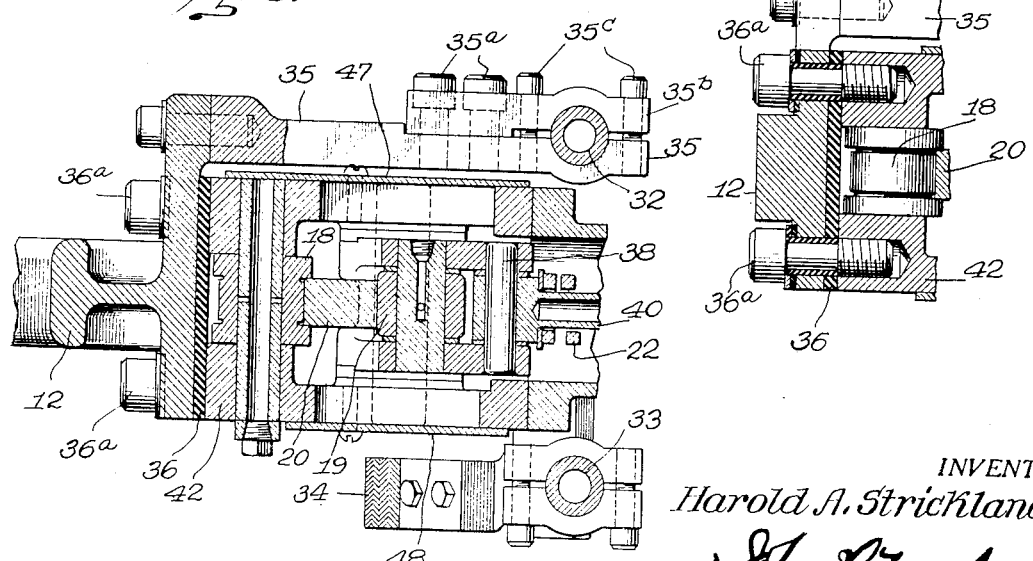

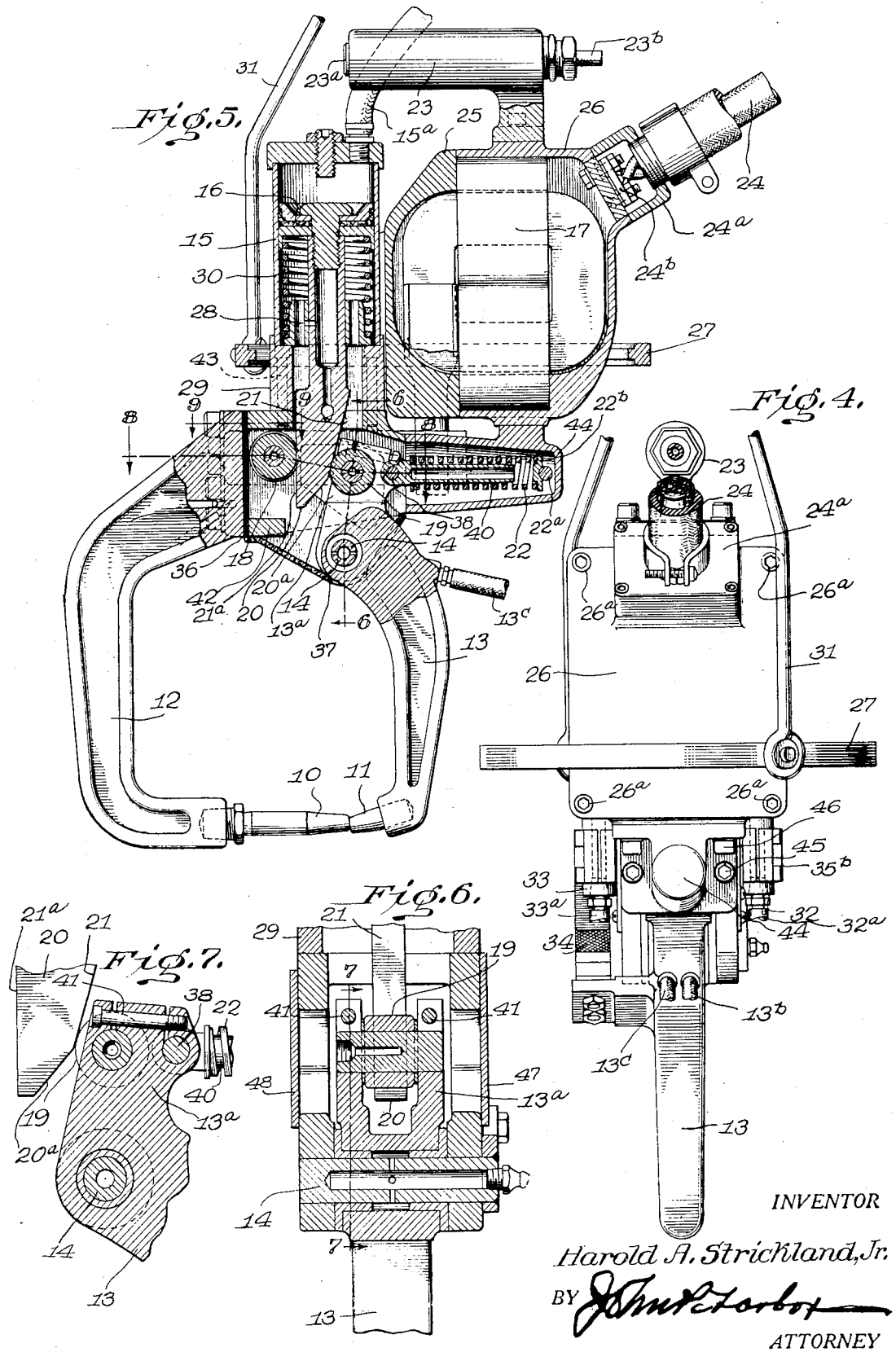

May 30, 1944. H. A. STRICKLAND, JR 2,349,835
WELDING TOOL
Filed Sept. 25, 1941 4 Sheets-Sheet 4
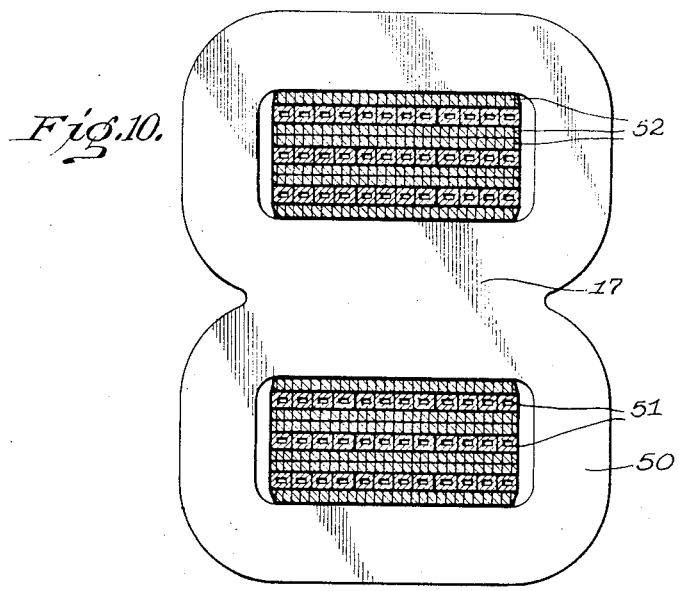
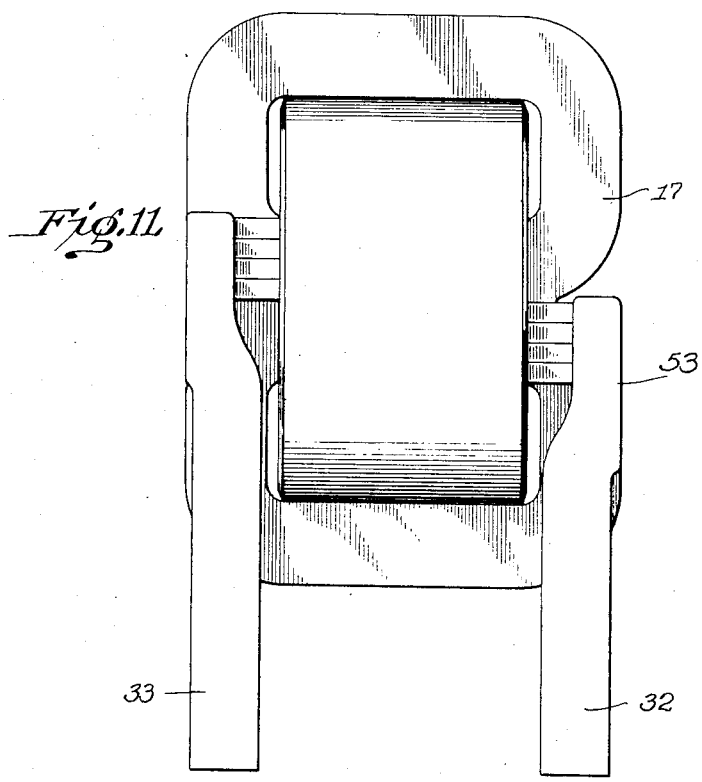
INVENTOR
Harold A. Strickland, Jr.
BY
ATTORNEY Patented May 30, 1944

2,349,835

UNITED STATES PATENT OFFICE 2,349,835

WELDING TOOL

Harold A. Strickland, Jr., Detroit, Mich., assignor to Budd Wheel Company, Philadelphia, Pa., a corporation of Pennsylvania Application September 25, 1941, Serial No. 412,235

14 Claims. (Cl. 219—4)

This invention relates to welding apparatus of the portable type for a pair of welding electrodes, a motor controlling them, and a transformer supplying them with welding current.

An object of the invention is to provide a device of this class which gives rapid movement to the electrodes when no pressure is required and slow movement under greatly increased pressure where such pressure is desired. Another object is to provide such a device which is adapted to different types of work thickness and to different kinds of electrodes. A further object is to provide a tool of this sort having increased transformer capacity without a corresponding increase in cost. Yet another object is to provide such a tool in which the piston rod bushing in the motor has a slight floating ability to aid in aligning the parts in assembly. Still a further object resides in the provision of a primary tapping strip inside of a cord entrance box whereby adjustments for welding heats may be made without having to open the transformer housing. Yet a further object is to provide a portable welding tool which is compact, convenient to handle, and which is adapted to apply high pressure to the electrodes without the use of excessive fluid pressure in the motor. Another object is to provide a welding tool in which the mechanism for transmitting power to the electrodes is provided with a flexible protector against weld spatter.

Referring to the drawings;

Fig. 1 is a side view of one embodiment of this invention,

Fig. 2 is a top plan view of the device shown in Fig. 1,

Fig. 3 is an opposite side view of the lower portion of the device shown in Fig. 1, Fig. 4 is a right side view of the device shown in Figs. 1 and 5, Fig. 5 is a longitudinal section of the device of Fig. 7, Fig. 6 is a section on the line 6—6 of Fig. 5, Fig. 7 is a section on the line 7—7 of Fig. 6, Fig. 8 is a section on line 8—8 of Fig. 5.

Fig. 9 is a section on line 9—9 of Fig. 5.

Fig. 10 is a view through the primary and secondary windings of the transformer shown in section, and Fig. 11 is a side view of the transformer showing the terminal connections.

The construction shown in Fig. 1 includes a pair of welding electrodes 10 and 11 supported by the arms 12 and 13 respectively, which are pivotally secured together by the stationary pivot pin 14. The supporting arm 12 is fixed with respect to a fluid pressure motor which includes a cylinder 15 having a fluid pressure line 15a leading to the cylinder above the piston 16 as shown in Fig. 5. The piston body preferably includes the two clamping portions between which is placed a flexible washer of leather, felt, or other appropriate material. A transformer 17 is located close beside the fluid pressure motor. A wedge 20 is integral with the lower end portion of a piston rod screw threaded on the piston as shown in Fig. 5. The wedge 20 is movable between the rollers 18 and 19 which may or may not be of the anti-friction type. The roller 18 is mounted on a stationary axis and engages the face 21a of the wedge while the roller 19 is mounted upon a bell crank extension 13a of the arm 13, so that as the wedge moves downward the roller 19 is moved away from the roller 18 and the arm 13 swings about its pivot pin 14 moving the electrode 11 toward the electrode 10. The face 21a of the wedge is substantially parallel with the cylinder axis while the opposite face of the wedge is formed by the portions 20a and 21 which are at different angles with respect to each other and with respect to the face 21a.

A spring 22 operates with the arm 13a and also with a stationary casing 44 through the rod 22a and the spring abutment 22b which is shaped to engage the rod 22a. A guide 40 for the spring 22 extends within the spring as shown in Fig. 5 and is pivotally secured at 39 to the arm 13a. In this way the spring 22 presses the roller 19 against the wedge 20 and keeps the wedge in contact with the roller 18 so that the roller 18 acts as an abutment for the spring 22.

A handle 23 is located over the transformer and is provided with a thumb actuated valve or switch 23a so that through the control connection 23b either the fluid pressure to the motor or the primary connection to the transformer may be controlled, or both of them may be so controlled from the handle. A cord entrance box 24a receives the connections from the primary leads 24 to a tapping strip 24b. This strip 24b contains a number of terminals connected to the primary of the welding transformer. On removal of the cord entrance box access is provided to the tapping strip 24b so that the primary leads may be connected to whatever taps are desired for the welding heat found most suitable. In this way the transformer may be adjusted to provide the welding heat desired without having to open the transformer casing comprised of the sections 25 and 26. Bolts 26a extend generally horizontally as shown in Figs. 4 and 5 for securing the two portions of the transformer casing together with the portion 25 abutting the laminations 50. The entire tool is rotatably adjustable within a supporting ring 27 to which the pivotal ball 31 is secured.

The lower end portion of the cylinder 15 is open except for the bushing 28 which is shown in Fig. 5 as being of smaller diameter than the inside of the cylinder so that this bushing may float within limits. The lower end of the piston rod or wedge is guided in one direction by the rollers 18 and 19 and in another direction by flanges on the roller 18 which snugly engage the sides of the wedge as shown in Fig. 8. Having the bushing 28 floating aids in assembly. This bushing 28 is shaped to constitute a support and guide for the lower convolutions of the spring 30 which tends to raise the piston upon release of fluid pressure upon the piston. As shown in Fig. 1 the cylinder 15 is secured to a casing portion 26 by means of the bolts 29a and the casing portion 26 is connected by the bolts 43, shown in dotted lines in Fig. 5, to the lower casing portion 42 which encloses the transmission mechanism.

The terminals from the secondary of the transformer 17 are both stationary, one of them 32 being connected through the clamp 35b and 35 to the stationary arm 12 as shown in Fig. 8 while the other secondary connection 33 is secured to the arm 13 as shown in Fig. 1 by means of the flexible or laminated copper conductor strip 34. Conductor clamping strip 35b is shown in Fig. 8 as being secured to a strip 35 by means of the clamp screws 35a which retain the strips in good electrical contact, additional screws 35c being provided for the conductor 32. Bolts 36a are insulated from the arm 12 and clamp this arm to the casing portion 42. Insulation 36 separates the arm 12 from the arm 13 and from the motor and transmission mechanism. Water connections 32a and 33a supply the inside of the secondary conductors for cooling the transformer. Water connections 13b and 13c are provided for the arm 13 so that this arm and its electrode may be cooled as close to the work as is desired. The water passages within the arm 13 have not been shown since they are not a part of the present invention but they are located within the beaded appearing portions of these arms. Water connections 12a and 12b are provided for cooling the arm 12 and its electrode in a somewhat similar manner to what was mentioned for the arm 13. The lower end portion of the transmission casing 42 is protected against the entrance of weld spatter by a flexible leather boot or shield 37. As shown in Fig. 7 a bolt 41 clamps the split end of the arm 13a upon the pivot pin 38 and the pin of the roller 19. Bolts 45 shown in Fig. 4 secure the spring casing 44 to the transmission casing 42. Additional bolts 46 secure the spring case 44 to the transformer housing portion 26. As shown in Fig. 8 cover plates 47 and 48 enclose the transmission mechanism against the entrance of dirt or other foreign matter.

The spring 22 tends to spread the electrodes 10 and 11 and the piston actuated wedge tends to close them by downward movement upon the application of fluid pressure above the piston 16. The steeply inclined surface 20a of the wedge relatively moves the electrodes rapidly together while the less steeply inclined portion 21 of the wedge effects a slower movement of the electrodes adjacent the work. With different thicknesses of the work it will be desired to substitute a different shape of wedge. Both the springs 22 and 30 assist in raising the piston 16 upon reduction in fluid pressure. It should be observed that in a uniform linear movement of the wedge there is both rapid and slow pivotal movement of the electrodes.

As shown in Fig. 10 the laminations 50 have the secondary windings 51 and the primary windings 52 layered thereon. The secondary terminal connections 32, 33 are made to the tubular secondary conductors as described in my prior application Ser. No. 299,984, filed Oct. 18, 1939, now Patent No. 2,318,024, dated May 4, 1943. The present construction contemplates a removable cover portion 53 of the type described and illustrated in said prior application. A difference over the construction shown in said prior application resides in the provision of better cooling in the primary winding, since each secondary conductor having a fluid passage therein is located between layers of primary windings so that more efficient cooling is obtained for the primary convolutions.

What is claimed is:

1. A welding apparatus having an electrode, a pivot about which said electrode is movable, a motor for moving said electrode, mechanism for changing the ratio of the movements of motor and electrode so as to more rapidly move said electrode when remote from the work than when adjacent thereto, whereby greater pressure is applied to the electrode at one time than at another.

2. A welder comprising opposite electrodes mounted on arms pivotally secured, a roller on one arm spaced from the pivot of said arms on the side of the pivot away from the electrodes, a wedge against which said roller is held to move one of said electrode arms, the side of the wedge engaging said roller being constructed to effect different increments of movement to said electrodes for equal increments in travel of said wedge, an abutment for engagement with the wedge on the side thereof opposite that engaged by said roller, means for sliding said wedge, and means for holding said roller against said wedge and its abutment.

3. A welder comprising a pair of electrodes, means for opening and closing said electrodes, said means including a wedge movable between rollers engaging opposite faces of the wedge, at least one face of the wedge having portions which form different angles of inclination to the opposite face, said wedge being removable for replacement by a wedge of different shape for operation of another type of work.

4. A welding apparatus comprising a pair of opposite electrodes, a motor for producing relative movement between said electrodes, and transmission mechanism between said motor and electrodes for producing relative movement between said electrodes rapidly in one portion of their travel and slowly in another portion in response to equal increments of motor movement.

5. A welding apparatus comprising a pair of opposite electrodes, a motor for closing said electrodes, spring means for opening the electrodes and maintaining them open, and transmission mechanism for producing relative movement between said electrodes through large travel at first in closing them and then through a much less distance when adjacent the work and in response to equal movements by said motor.

6. A welding tool including a pair of opposite electrodes, a fluid pressure cylinder and piston for moving said electrodes toward one another, a wedge connected to one of said piston and cylinder and slidable therewith, one side of said wedge being substantially parallel with the axis of said cylinder, the opposite side of said wedge forming at least two different angles to the first side of the wedge with the steeper of the two wedge side portions being located adjacent the vertex of the wedge sides, a roller having a stationary axis and against which the first mentioned side of the wedge cooperates, another roller having an axis fixed with respect to a movable electrode for cooperation with the opposite side of said wedge and a spring pressing said rollers against said wedge and tending to separate said electrodes, and a second spring cooperating with the movable one of said piston and cylinder and tending to move the wedge out from between said rollers whereby the first spring may move the rollers toward one another and separate said electrodes.

7. A welder having a movable electrode, a fluid pressure piston and cylinder for actuating said electrode, a movable wedge carried by said piston and having one face thereof substantially parallel to the axis of said cylinder, a roller having a substantially fixed axis and guide flanges for engaging opposite sides of said wedge bounding the surface thereof which is parallel to the cylinder axis, another roller engaging an inclined face of said wedge, means connecting said second mentioned roller and said electrode, a substantially stationary bushing around said piston rod intermediate the piston and first mentioned roller, said bushing having a limited floating movement around said piston rod, whereby said rod is normally guided by the piston and first mentioned roller but may be guided by said bushing when more than a predetermined lateral displacement of said piston rod has occurred.

8. The combination according to claim 7 in which a coil spring cooperates with and is located between said piston and bushing, the bushing being provided with upstanding walls within said spring.

9. A welding tool including a pair of opposite electrodes, motor means comprising two members of which the one is translationally movable with respect to the other and serving for moving said electrodes toward one another, a wedge being connected to one of said members and being slidable therewith, one side of said wedge being substantially parallel to the direction of movement of said member whereas the other side is at an angle to said direction, a roller having a stationary axis against which the first-mentioned side of said wedge rests, another roller having an axis fixed with respect to a movable electrode for cooperation with the opposite side of said wedge, means for holding said rollers in contact with said wedge, for separating said electrodes and for retracting said member to which said wedge is connected.

10. A welder having opposite electrodes, a device for producing relative movement between said electrodes, said device comprising two members of which the one is translationally movable within the other, a pivot about which said relative movement between said electrodes occurs, means between one of said members and a portion of one of said electrodes for transforming the movement of said member into a movement of said portion of said electrode which latter movement is directed transversely to the movement of said member and to the axis of said pivot, said pivot and said electrode portion being approximately aligned in a plane extending nearly parallel to the direction of movement of one of said members, and a transformer for supplying current to said electrodes, said transformer being adjacent and longitudinally overlapping said device, and located laterally of a line through said pivot and device.

11. A welding apparatus comprising a pair of opposite electrodes, a motor for producing relative movement between said electrodes, and transmission mechanism between said motor and electrodes for producing relative movement between said electrodes rapidly and slowly successively into engagement and slowly and rapidly successively out of engagement in response to equal increments of motor movement.

12. A welding apparatus comprising a pair of opposite electrodes, a motor for producing relative movement between said electrodes, and transmission mechanism between said motor and electrodes for producing relative movement between said electrodes rapidly and slowly successively into engagement and slowly and rapidly successively out of engagement in response to equal increments of motor movement, said slow and rapid movement being linear relative to the motor movements.

13. A welder comprising opposite electrodes, a pivot about which relative movement between said electrodes is established, rollers axially mounted on arms for the electrodes, a wedge slidable between said rollers for closing said electrodes, yieldable means cooperating with said arms for opening said electrodes, and a translating device of the cylinder-piston type for sliding said wedge, said wedge having at least one face divided into surfaces having different angles of inclination to the axis of the wedge whereby the electrodes have different movement for equal sliding increments of said wedge.

14. A welder comprising opposed co-acting electrodes, a relatively fixed support for one of said electrodes, a pivot on said fixed support, a relatively movable support mounted on said pivot for the other of said electrodes, said movable support having an arm extending beyond the pivot from said electrode, a roller mounted on the arm of said movable support, a roller mounted on said fixed support adjacent to the movable support roller, a wedge mounted on said fixed support and slidable between said rollers for closing said electrodes, yieldable means cooperating with said arm for opening said electrodes, and a translating device for sliding said wedge, the line of movement of said wedge on its support being fixed.

HAROLD A. STRICKLAND, Jr.